US006763924B2

(12) United States Patent
Olbrich

(10) Patent No.: US 6,763,924 B2
(45) Date of Patent: Jul. 20, 2004

(54) APPARATUS AND METHOD FOR CHANGING CURRENCY

(76) Inventor: John H. Olbrich, 108 Ivy St., San Diego, CA (US) 92101

( * ) Notice: Subject to any disclaimer, the term of this patent is extended or adjusted under 35 U.S.C. 154(b) by 204 days.

(21) Appl. No.: 10/197,898

(22) Filed: Jul. 16, 2002

(65) Prior Publication Data

US 2004/0011621 A1 Jan. 22, 2004

(51) Int. Cl.⁷ .............................................. G06F 19/00
(52) U.S. Cl. .......................... 194/217; 186/37; 235/375; 705/14
(58) Field of Search ................................ 194/217, 205, 194/206, 215, 216, 219, 302; 186/35, 36, 37; 235/375; 700/900; 705/1, 14, 400

(56) References Cited

U.S. PATENT DOCUMENTS

| 3,791,392 A | | 2/1974 | Hanson ........................... 133/1 |
| 4,150,740 A | | 4/1979 | Douno ......................... 194/4 C |
| 4,190,066 A | | 2/1980 | Burnside ..................... 133/4 R |
| RE32,115 E | * | 4/1986 | Lockwood et al. .......... 235/381 |
| 5,039,848 A | | 8/1991 | Stoken ........................ 235/381 |
| 5,620,079 A | | 4/1997 | Molbak ........................ 194/217 |
| 5,868,236 A | * | 2/1999 | Rademacher ............... 194/217 |
| 6,264,556 B1 | | 7/2001 | Izawa et al. .................. 463/25 |
| 6,484,863 B1 | * | 11/2002 | Molbak ........................ 194/216 |

FOREIGN PATENT DOCUMENTS

| CA | 2354419 A1 | * | 4/2002 | ........... G06F/17/60 |
| EP | 0253240 A1 | * | 1/1988 | ............ G07G/1/00 |
| GB | 2175427 A | * | 11/1986 | ........... G07F/17/42 |

* cited by examiner

Primary Examiner—Donald P. Walsh
Assistant Examiner—Mark J Beauchaine
(74) Attorney, Agent, or Firm—Mary Jo Redman; Calif Tervo

(57) ABSTRACT

Automated currency changing machine (10) accepts twenty dollar bills and dispenses a combination of dollar and non-cash items in exchange. Bill intake module (20) receives a bill and checks its value and authenticity Programmable controller (32) calculates change to be given by change dispensing module (40), according to a predetermined algorithm. A combination of dollar bills and non-cash items, such as coupons or tokens, is dispensed.

Non-cash items have "cash equivalent value" to the customer and a smaller "cost equivalent value" to the business where machine (10) is in use. The combined value of dollar bills and "cash equivalent value" of non-cash items is preferably equal to or greater than the value of bill proffered by customer. The combined value of dollar bills and "cost equivalent value" of non-cash items is preferably less than the value of bill proffered.

5 Claims, 1 Drawing Sheet

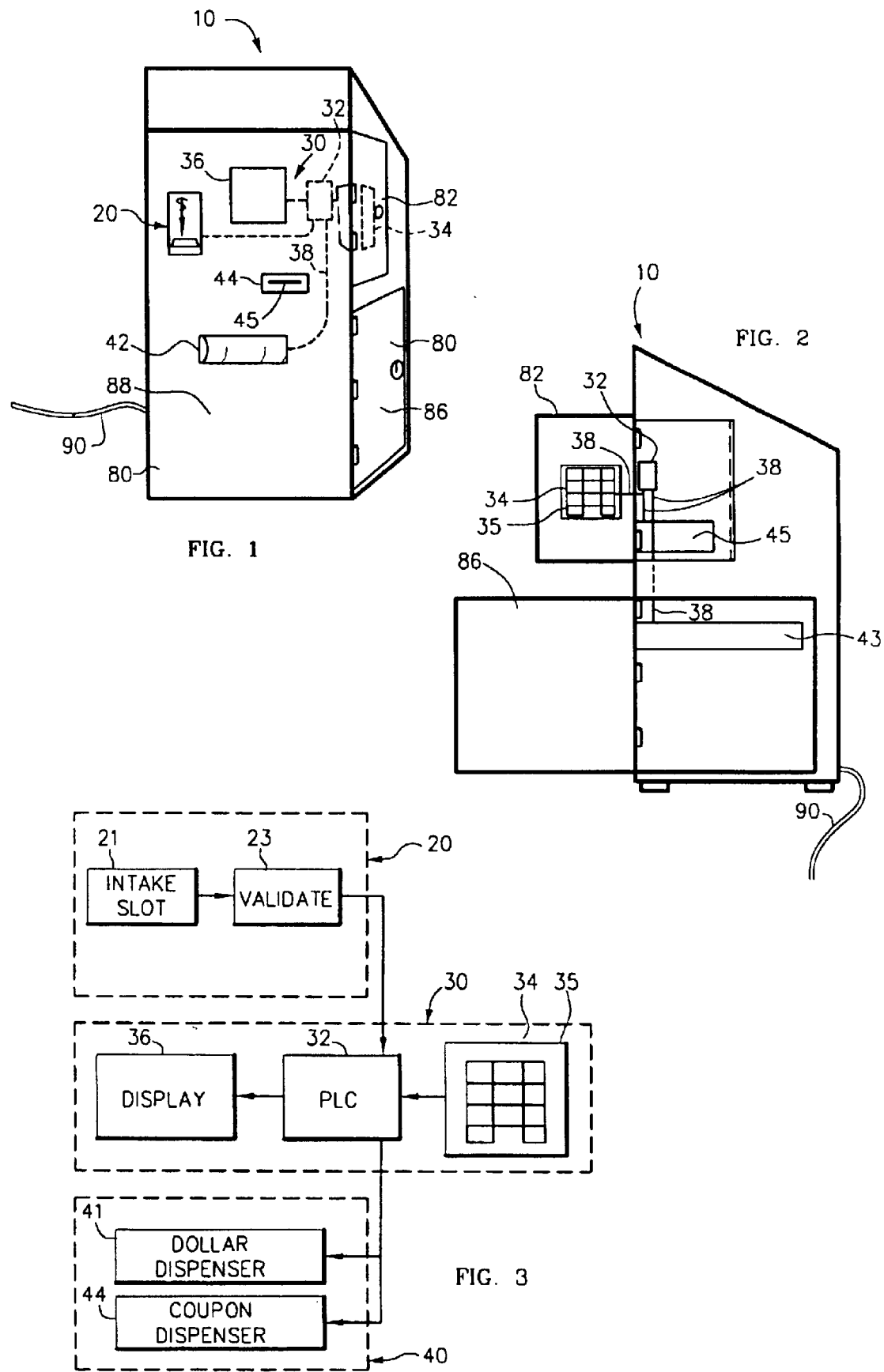

APPARATUS AND METHOD FOR CHANGING CURRENCY

FIELD OF THE INVENTION

This invention relates generally to automated cash-handling machines, and more particularly to a machine for changing large denomination currency into small denomination currency.

BACKGROUND OF THE INVENTION

In certain types of business establishments, customers routinely expect an employee of the business to change currency, typically twenty dollar bills, into smaller bills, especially one dollar bills. Examples of such businesses are video game parlors, casinos, and exotic dance establishments.

In casinos, many automated gambling games, such as slot machines, require insertion of a dollar bill to start play. Customers can obtain dollar bills in exchange for larger bills from a cashier. In bars and other venues where exotic dancers perform, customers often give the dancers tips Dollar bills are a common tip, which customers usually obtain from a waitress in exchange for a larger bill.

Customers have typically obtained the cash they bring to the business from an automated teller machine (ATM), which nearly all dispense only twenty dollar bills In some cases, there is an ATM associated with the business establishment so that customers can replenish their cash supply as needed Many ATMs charge a transaction fee for their use. The transaction fees are typically small, yet are a source of irritation to many of the customers who use them to obtain cash.

In both casinos and dance establishments, customers may wait a long time to receive change from an employee of the business. The time the customer spends waiting is unproductive from both the customer's and the business owner's points of view. An employee is also tied up with making change instead of doing more productive work. Humans sometimes make errors when changing currency, which can cost the business either money or goodwill, depending on who was "favored" by the error.

There had been a need for a more productive method of changing customers'currency into dollar bills in casinos, exotic dance establishments, and other businesses where customers employ a great many dollar bills There is additionally a need for an automated method of providing change that does not tie up much of the employees'time and does not make errors. There is a need for an automated method of changing currency that does not increase business costs yet does not alienate customers by charging an unpalatable transaction fee.

SUMMARY OF THE INVENTION

The present invention is an automated apparatus for changing currency, such as twenty dollar bills, into a combination of smaller currency, such as dollar bills, plus other non-cash items.

The apparatus is largely made up of standard cash handling equipment commonly available. A bill accepter/validator receives a twenty dollar bill proffered by a customer and checks its value and authenticity. A programmable controller calculates what will be given in exchange for the bill. A combination of dollar bills and non-cash items are dispensed to the customer.

The non-cash items are items that have a certain "cash equivalent value" to the customer and a smaller "cost equivalent value" to the business where the currency changing machine is in use. The combined value of the dollar bills and the "cash equivalent value" of the non-cash items is preferably equal to or greater than the value of the bill proffered by the customer. The combined value of the dollar bills and the "cost equivalent value" of the non-cash items is preferably less than the value of the bill proffered to the business.

For example, the present currency changing machine, if located in a casino, might be programmed so as to return sixteen dollar bills and a coupon for a free cocktail in exchange for a twenty dollar bill If cocktails in that casino sell for $4 and cost fifty cents to make, the coupon's cash equivalent value to the customer is $4 and its cost equivalent value to the casino is 50¢. The customer believes he has received the equivalent of twenty dollars in change, but the casino owner believes he has returned only $16.50 in change for the twenty dollar bill.

The difference between the cash equivalent value and the cost equivalent value subsidizes the cost of buying and operating the currency changing machine so that no transaction fee need be extracted from the customer.

Many modifications and variations of the present invention are possible. The machine can be adapted to accept a range of currency and to provide variable combinations of cash and coupons. Also, the machine can be adapted to return all non-cash items, such as a combination of gambling or game machine tokens and coupons in exchange for a large bill. The machine can be adapted to provide other denominations of currency in the change, such as a combination of ten, five, and one dollar bills in exchange for a hundred dollar bill Many variations are envisioned but not specifically illustrated or described.

The features and advantages of the invention will be readily understood when the detailed description thereof is read in conjunction with the accompanying drawings wherein like reference numerals refer to like parts throughout.

BRIEF DESCRIPTION OF THE DRAWINGS

FIG. 1 is a perspective view of the currency changing machine of the present invention.

FIG. 2 is a right side elevation view of the machine of FIG. 1, with access doors open to show interior.

FIG. 3 is a simplified block diagram of the logic operation of the currency changing machine.

DETAILED DESCRIPTION OF THE INVENTION

FIG. 1 is a perspective view of the currency changing machine 10. FIG. 2 is a right side elevation view of machine 10 of FIG. 1, with access doors open to show the interior. FIG. 3 is a simplified block diagram of the logic operation of currency changing machine 10

Currency changing machine 10 generally includes bill intake module 20, controller means 30, and change dispensing module 40. The purpose of machine 10 is to accept a bill of paper money from a customer, evaluate the value and authenticity of the bill, and return change to the customer, such as a combination of one dollar bills and non-cash items.

Currency changing machine 10 includes several components attached to each other and in communication, such as housed together in a cabinet 80. Cabinet 80 may be of any convenient shape and is depicted here as an upright cabinet taller than an average person and shaped as a rectangular prism with a backwardly down-slanted top Cabinet 80 includes front panel 88, programming access door 82, and cash door 86

Bill intake module 20 includes bill drive 22 and slot 21, located on front panel 88, and a bill validator 23. Drive 22 pulls a bill presented by a customer through slot 21 to the validator 23 (seen in FIG. 3). Validator 23 determines the denomination of the bill and checks its authenticity. Currency acceptance and validation equipment is well known in the art of automated payment, such as is common at self-service gas stations, and is not described in detail herein Equipment is available that accepts only a single denomination of currency, typically twenty dollar bills, or that can accept a variety of denominations Either type can be used for currency changing machine 10 of the present invention.

Validator 23 is in communication with controller means 30, such as a programmable logic controller 32. The communication means is typically a wire 38, through which electrical signals are sent Programmable controller 32 typically includes an input means 34, such as keypad 35, for programming controller 32, a display readout 36 for displaying the program parameters. Wires 38 transmit electrical power and information signals among bill intake module 20, programmable controller 32, and change dispensing module 40. The electricity for running all functions of machine 10 is provided through electrical supply line 90, which would typically have a plug (not shown) adapted for being plugged into a wall outlet Potential functions, envisioned but not illustrated herein, include general lighting of front panel 88, electrically-powered locks for access doors 82, 86, and music or video output for enticing customers to approach machine 10.

Programmable controller 32 is also in communication with change dispensing module 40. Change dispensing module 40 dispenses change to the customer according to instructions from programmable controller 32 Change dispensing module 40, in the embodiment illustrated, includes dollar bill dispenser 42, dollar bill cassette 44, coupon dispenser 44, and coupon cassette 45.

The coupons dispensed by dispensing module 40 are typically coupons for free or discounted products or services offered by the business establishment that operates currency changing machine 10. A typical example would be a coupon for a free cocktail offered by a casino or dance establishment Such a coupon would have a "cash equivalent value" to the customer equal to the money the customer would normally pay for a cocktail and a "cost equivalent value" to the business owner equivalent to the cost of making the cocktail, In this example, if a cocktail cost fifty cents to make and was sold for $4 00, the "cost equivalent value" would be fifty cents and the "cash equivalent value" would be $4.00.

To continue the example, if currency changing machine 10 were programmed to include one free drink coupon in the change for a twenty dollar bill in place of an equivalent value of dollar bills, the customer would receive sixteen dollar bills and one coupon for a free cocktail in exchange for each twenty dollar bill. As the customer was presumably going to buy a cocktail anyway, the customer will be satisfied with this transaction The customer has received cash equivalent value of $20 in exchange for his twenty dollar bill From the point of vies of the business owner, though, machine 10 has dispensed a cost equivalent value of $16.50 in exchange for a twenty dollar bill The business owner has made a profit of $3.50 from the transaction. Also, the customer is quickly free to begin spending the $16 for gambling or other entertainments, which pleases both the business owner and the customer In an exotic dance establishment, a customer often wants a quantity of dollar bills to use as tips for the dancers and waitresses. The customer may tuck folded bills into the dancers' clothing to reward the dancers and as a source of additional entertainment to the customer If machine 10 is used in a dance establishment, another type of change dispensed could be "tip tokens" that dancers or waitresses could redeem for cash from the business owner at a later time. The tip tokens could, for example, be lengths of diffraction-patterned ribbon stored on a reel and cut into strips as they are dispensed. Such ribbons, tucked into a dancer's clothing, would enhance the dancer's appearance and performance, rather than detract from it, as dollar bills do In the case of a machine 10 that dispensed only tip tokens and coupons, the overall amount of cash in use at the establishment would be decreased and the only cash handling machine 10 would require would be that of emptying the large denomination currency proffered by customers In a casino, customers may desire dollar bills for gambling using automated gambling machines. Currency changing machine 10 can be used for providing dollar bills for this purpose, or machine 10 may alternatively be adapted to dispense a combination of coupons and tokens that the gambling machines are adapted to accept. This alternative embodiment also decreases the amount of cash in circulation within the business establishment and decreases the associated costs of handling cash.

Machine 10 is illustrated in the drawings as having a single coupon dispenser 44 with a cassette 43 for storing a single type of coupon. Alternatively, machine 10 can include multiple coupon dispensers 44 for dispensing coupons for more than one product or service Each coupon may be dispensed from a dedicated coupon slot 45 or multiple coupon dispensers 44 can deliver coupons serially to dollar bill slot 42, such that all change dispensed is received by the customer from the same slot 42 Alternatively, multiple coupons may be pre-printed on a single slip of paper that the customer can tear apart to redeem the coupons.

In yet another alternative, coupon dispenser 44 includes a printer (not shown) that produces coupons as they are dispensed, replacing Coupon cassette 46.

If multiple coupons are dispensed, it may be preferable that the coupons have small cash equivalent value. For example, a customer in a casino may receive an assortment of coupons for such offers as a fifty-cent discount off any drink, a 10% discount on a buffet dinner, a small token for operating a gambling machine, plus a 10% discount on an item purchased in an associated store. Because the customer is unlikely to use every coupon in the assortment, the cash equivalent value is preferably greater than the value of the currency proffered so that the customer remains satisfied with the transaction. The business owner can afford to allow the total cost equivalent value of the combination of dollar bills and coupons approach the value of the currency proffered because not all of the coupons will be redeemed. The coupons may have advertising value to the business owner, which can effectively be subtracted from the cost equivalent value in determining the business owner's profit on each transaction.

Controller means 30 preferably includes input means 34 to allow the business owner to change the combination of dollar bills and coupons dispensed by machine 10. In the case of a machine 10 that accepts only one denomination of currency, input means 34 can be a simple as mechanical thumb wheels (not shown) that are turned to specify the number of dollar bills and number of coupons dispensed in exchange.

More flexibility is achieved if controller 30 includes programmable logic controller, or PLC, 32 and input means 34 is more sophisticated, such as a keypad 35, connected to PLC 32 by wires 38 and mounted within cabinet 80. To use keypad 35 for programming, an authorized person can unlock and open programming access door 82 When access door 82 is locked, other persons are not able to change the programming, damage PLC 32, or gain access to coupon cassette 46 A display device 36, such as an LED array or video monitor, helps the person programming PLC 32 by displaying prompts and parameter settings In FIG. 1, display device 36 is illustrated mounted on front panel 88 of cabinet 80. In this position, display device 36 can also prompt the customer how to operate machine 10 and inform the customer of the current settings, that is, what will be dispensed as change for a certain bill. When machine 10 is not in active use, display device 36 may be used as an advertising display or to provide other messages to customers Keypad 35 may be used to enter messages for display by display device 36.

Programming access door 82 allows access to keypad 35 and to coupon cassette 46. A person authorized to use programming access door 82 could thus change the programming of PLC 32, add coupons to coupon cassette 46, exchange coupon cassette 46 for one containing another type of coupons, or service a coupon printer (not shown) if one is used Programming access door 82 does not provide access to cash storage and handling equipment Cabinet 80 includes a cash access door 86 for access to the cash handling area of machine 10. It is expected that fewer persons would be authorized to open cash access door 86 than can open programming access door 82 and that cash door 86 would typically be opened when no customers were present. With cash access door 86 open, an authorized person, such as an employee of a cash delivery service, could add dollar bills to dollar bill cassette 43, replace a depleted cassette 43 with a full cassette 43, or empty or remove the currency receptacle (not shown) that receives and stores the large denomination bills proffered by customers.

Although particular embodiments of the invention have been illustrated and described, various changes may be made in the form, composition, construction, and arrangement of the parts herein without sacrificing any of its advantages Therefore, it is to be understood that all matter herein is to be interpreted as illustrative and not in any limiting sense, and it is intended to cover in the appended claims such modifications as come within the true spirit and scope of the invention.

I claim:

1. An apparatus for changing currency into dollar bills plus non-cash items; including a bill intake module for accepting a bill of currency having a value of at least five dollars from a customer;

change dispensing means for dispensing a combination of dollar bills and a non-cash item; and controller means for controlling the combination to be dispensed, in communication with said bill intake module and said change dispensing means, said non-cash item having a cash equivalent value; and a cost equivalent value that is less than the cash equivalent value; said combination of dollar bills and said non-cash item being calculated such that the value of the dollar bills plus the cash equivalent value of said non-cash item is equal to or greater than the value of the bill of currency accepted from the customer; and the value of the dollar bills plus the cost equivalent value of said non-cash item is less than the value of the bill of currency accepted from the customer.

2. The apparatus for changing currency into dollar bills of claim 1, said non-cash item comprising a plurality of non-cash items.

3. The apparatus for changing currency into dollar bills of claim 1, wherein said bill intake module, said change dispensing means, and said controller means are mounted in a common cabinet; said cabinet having slots through which the customer can insert currency into said bill intake and receive change from said change dispensing means.

4. The apparatus of claim 2, said non-cash items including:

coupons for discounts on goods or services sold by the owner or operator of the apparatus.

5. A method of changing currency into dollar bills plus at least one non-cash item, including:

providing a currency changing machine that includes a bill intake module for accepting a bill of currency from a customer, a change dispensing means for dispensing a combination of dollar bills and at least one non-cash item; and a controller means in communication with the bill intake module and the change dispensing means, the controller means for controlling the change to be dispensed; and the at least one non-cash item having a cash equivalent value to the customer and a cost equivalent value to the operator of the currency-changing machine that is less than the cash equivalent value;

transmitting a signal from the bill intake module to the controller means to cause the controller means to calculate a combination of dollar bills and at least one non-cash item to be dispensed in exchange;

transmitting signals from the controller means to the change dispensing means to cause a combination of dollar bills and at least one non-cash item to be dispensed such that the value of the dollar bills plus the cash equivalent value of the at least one non-cash item is equal to or greater than the value of the currency accepted from the customer and the value of the dollar bills plus the cost equivalent value of the at least one non-cash item is less than the value of the currency accepted from the customer.

\* \* \* \* \*